US010393311B2

(12) United States Patent
Sisto

(10) Patent No.: US 10,393,311 B2
(45) Date of Patent: Aug. 27, 2019

(54) SUPPORT ASSEMBLY

(71) Applicant: Salvatore Sisto, Bradley Beach, NJ (US)

(72) Inventor: Salvatore Sisto, Bradley Beach, NJ (US)

(*) Notice: Subject to any disclaimer, the term of this patent is extended or adjusted under 35 U.S.C. 154(b) by 0 days.

(21) Appl. No.: 15/877,938

(22) Filed: Jan. 23, 2018

(65) Prior Publication Data
US 2018/0149307 A1 May 31, 2018

Related U.S. Application Data

(63) Continuation of application No. 14/934,429, filed on Nov. 6, 2015, now Pat. No. 9,874,309.

(51) Int. Cl.
*F16M 13/02* (2006.01)
*A47B 96/02* (2006.01)
*A47K 17/02* (2006.01)
*A47K 3/12* (2006.01)

(52) U.S. Cl.
CPC ......... *F16M 13/025* (2013.01); *A47B 96/022* (2013.01); *A47K 3/125* (2013.01); *A47K 17/022* (2013.01)

(58) Field of Classification Search
CPC ... F16M 13/025; A47K 17/022; A47B 96/022
USPC ................... 248/297.21, 220.1, 222.14, 251
See application file for complete search history.

(56) References Cited

U.S. PATENT DOCUMENTS

| 1,286,588 | A | * | 12/1918 | Goodykoontz | F16M 13/025 108/28 |
| 1,325,143 | A | * | 12/1919 | Conterio | F16M 13/025 108/152 |
| 2,182,600 | A | * | 12/1939 | Spetz | A47B 96/022 211/90.01 |
| 3,260,021 | A | * | 7/1966 | Katz | A47K 10/10 211/105.1 |
| 3,580,397 | A | * | 5/1971 | Triplett | A47H 1/102 211/105.4 |
| 3,891,091 | A | * | 6/1975 | Anderson | A47H 1/08 211/105.3 |
| 4,102,529 | A | * | 7/1978 | Neblung | E04F 11/181 256/70 |
| 4,220,316 | A | * | 9/1980 | Naka | E04F 11/1836 256/1 |
| 5,042,766 | A | * | 8/1991 | Baker | F16M 13/025 248/200.1 |
| 5,154,384 | A | * | 10/1992 | Owens | A47F 5/08 248/220.1 |

(Continued)

FOREIGN PATENT DOCUMENTS

DE 19848697 4/2000
JP 2004332404 11/2004

*Primary Examiner* — Muhammad Ijaz
(74) *Attorney, Agent, or Firm* — The Belles Group, P.C.

(57) ABSTRACT

A support assembly and a method of assembling the support assembly that includes a structural member that is delimited by a first end and a second end with a first end cap configured to be arranged within the first end of the structural member and a second end configured to be arranged within the second end of the structural member to mount the structural member to a structure. The support assembly allows for forces to be applied in all directions without causing rotation or disengagement of the support assembly from a mounting structure.

20 Claims, 17 Drawing Sheets

(56) References Cited

U.S. PATENT DOCUMENTS

| | | | | |
|---|---|---|---|---|
| 5,193,786 A * | 3/1993 | Guenther | ............... | E04F 11/18 |
| | | | | 256/59 |
| 5,469,682 A * | 11/1995 | Knight | ................. | E04F 19/028 |
| | | | | 256/59 |
| 6,386,518 B1 * | 5/2002 | Shreiner | ............. | E04F 11/1804 |
| | | | | 256/65.01 |
| 8,070,137 B2 * | 12/2011 | Bennett | ............... | A47K 17/022 |
| | | | | 256/65.15 |
| 8,839,980 B2 * | 9/2014 | Baines | ................... | A47K 3/281 |
| | | | | 211/90.03 |
| 2003/0209642 A1 * | 11/2003 | Fontana | ................ | A63B 27/00 |
| | | | | 248/231.91 |
| 2008/0179476 A1 * | 7/2008 | McGinness | ......... | E04F 11/1804 |
| | | | | 248/220.21 |
| 2011/0155880 A1 * | 6/2011 | Stimpson | ................ | E03C 1/06 |
| | | | | 248/285.1 |

\* cited by examiner

SUPPORT ASSEMBLY

CROSS-REFERENCE TO RELATED APPLICATIONS

This application is a continuation of U.S. patent application Ser. No. 14/934,429 filed on Nov. 6, 2015. The disclosure of the above application is incorporated herein by reference.

FIELD OF INVENTION

The present invention relates generally to a supporting structure and more particularly to a support assembly that is mountable between two converging structures.

BACKGROUND

Support assemblies and more specifically support assemblies that are mountable in a corner of a room between two converging walls are known. These support assemblies, such as foot rests, grab bars, and shelving systems are commonly used, for example, in household showers, locker rooms, spas and the like. However, existing support assemblies do not allow for any significant force to be applied thereon without the support assembly rotating and/or becoming disengaged from a fixed position. As such, an individual can be severely injured due to the limited force that can safely sustained by known support assemblies.

BRIEF SUMMARY

The present invention is directed to a support assembly that allows for significant forces to be applied in all directions without causing rotation or disengagement of the support assembly from a mounting structure. This is because, as will be described in more detail below, the end caps of the support assembly are not mounted in parallel to each other. As a result, the rotational axes of the end caps contrast each other and in turn stabilize a structure extending between and from the end caps. Moment forces only exist in the area of the structure that exceeds the axes of the end caps. As such, the moment forces are minimized and the torsion forces are negated by opposing each other resulting in an assembly that is stable and does not rotate upon a force being applied thereto.

In an embodiment, the present invention is directed to a support assembly that comprises a structure that has an outer surface and inner surface and that is delimited by a first and second end, a first end cap that includes a first body which has a first element (e.g., trapezoidal, triangular) that extends therefrom and that is configured to be arranged within the first end of the structure and a second end cap that includes a second body which has a second element (e.g., trapezoidal, triangular) that extends therefrom and that is configured to be arranged within the second end of the structure. In an embodiment, the structure can be a tubular member, a cantilevered plate or any other structure that extends between the end caps.

In an embodiment, the first and second ends of the structure lie in planes such that a first plane extends along the first end of the structure and a second plane extends along the second end of the structure to converge and intersect each other at a line centrally located between the ends of the structure. In an embodiment, the planes in which the first and second end of the structure lie are angled at approximately 45 degrees with respect to the axis of the structure so that the planes meet at angles of approximately 90 degrees.

In an embodiment, the first end cap is sized to encompass the first end of the structure and the second end cap is sized to encompass the second end of the structure. In an embodiment, the first and second end caps each have a body that is substantially ovoid to encompass the first and second end that are also substantially ovoid.

In an embodiment, the first end cap includes an opening extending through the first body and the first trapezoidal element and the second end cap includes an opening extending through the second body and the second trapezoidal element of the second end cap.

In an embodiment, the first trapezoidal element can substantially encompass a longitudinal diameter of the first body of the first end cap and the second trapezoidal element can substantially encompass a longitudinal diameter of the second body of the second end cap.

In an embodiment, the support assembly can further comprise a first insert fixed within the first end of the structure that includes a first slot configured to receive the first trapezoidal element and a second insert fixed within the second end of the structure that includes a second slot configured to receive the second trapezoidal element.

In an embodiment, the first insert and the second insert can include a base, a first projection extending from the base that has an outer surface which is contoured to be contactable with the inner surface of the structure and a second projection spaced from the first projection by the first slot extending from the base that has an outer surface that is contoured to be contactable with the inner surface of the body of the structure. In an embodiment, the first and second projections of the first and second inserts can each extend from the base of the insert at an angle that is substantially similar to the angle of the first end of the structure. In an embodiment, the angle at which the ends and projections extend is about 45 degrees.

In an embodiment, the support assembly can include a first opening extending between the outer and inner surface near the first end of the structure and a second opening extending between the outer and inner surface near the second end of the structure, a first hole extending through one of the first projection and the second projection of the first insert with the first insert adaptable such that the first hole is in alignment with the first opening and a second hole extending through one of the first projection and the second projection of the second insert with the second insert adaptable such that the second hole is in alignment with the second opening.

In an embodiment, the support assembly can include a first fastener extending through the first opening in the structure and the first hole in the first insert to fix the first end cap within the structure and a second fastener extending through the second opening in the structure and the second hole in the second insert to fix the second end cap within the structure. In an embodiment, the first fastener and the second fastener are each set screws.

In an embodiment, the structure, the first end cap and the second end cap can each be comprised of a metal, such as stainless steel and at least a region of the outer surface of the body of the tubular member can have an anti-slip surface.

In an embodiment, the present invention is directed to a method of assembling a corner support assembly. The method comprises the steps of providing a structural member that has an outer surface and an inner surface and that is delimited by a first end and a second end, a first end cap that includes a first body having a first surface and a second surface with a first trapezoidal element that is configured to be arranged within the first end of the structural member extending from the first body and a second end cap including a second body that has first surface and a second surface with a second trapezoidal element that is configured to be arranged within the second end of the structural member extending from the second body, fastening the first end cap to a first structure and the second end cap to a second structure such that the first trapezoidal element and the second trapezoidal element project from the first structure and second structure, respectively, orientating the first end of the structural member to encompass the first trapezoidal element and the second end of the structural member to encompass the second trapezoidal element and fixing the structural member to the first end cap and the second end cap.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Figure 16:
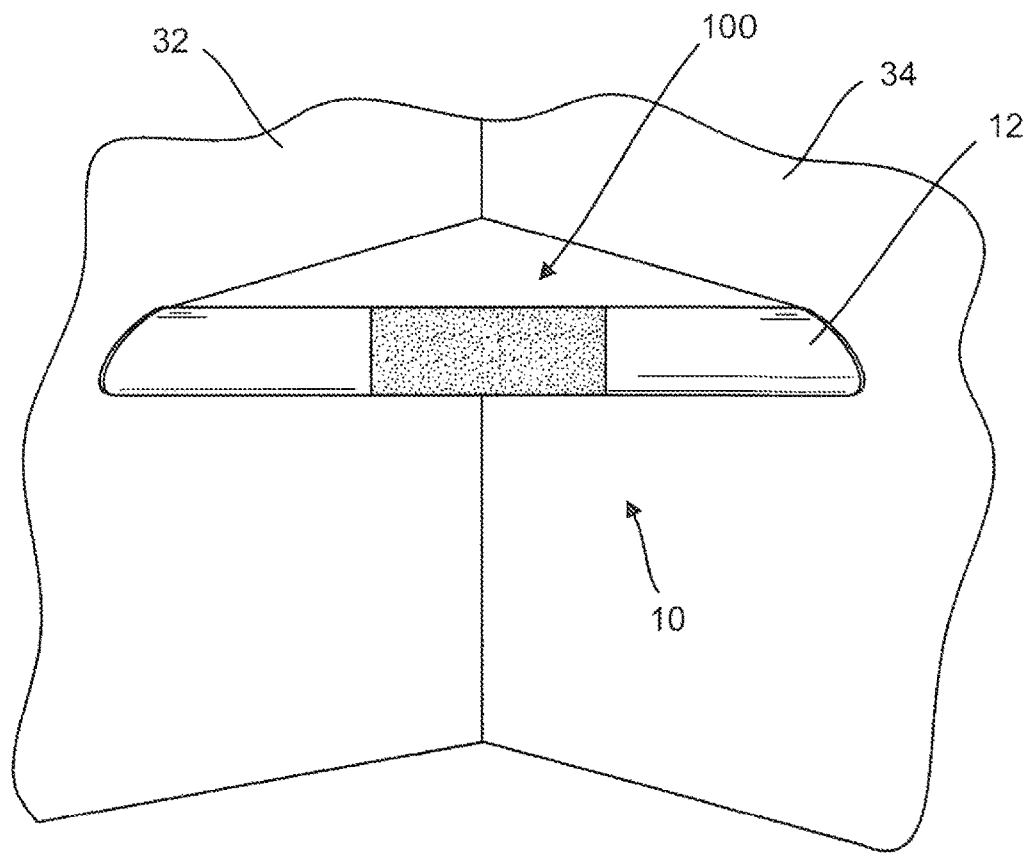
FIG. 16 is a perspective view of the support assembly in an assembled state, fixed to a structure that includes a cantilevered plate.
Figure 17:
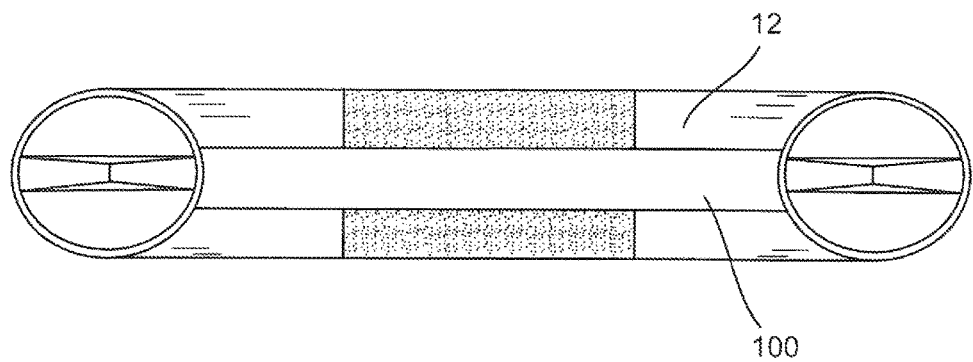
FIG. 17 is a rear view of FIG. 16.
Figure 18:
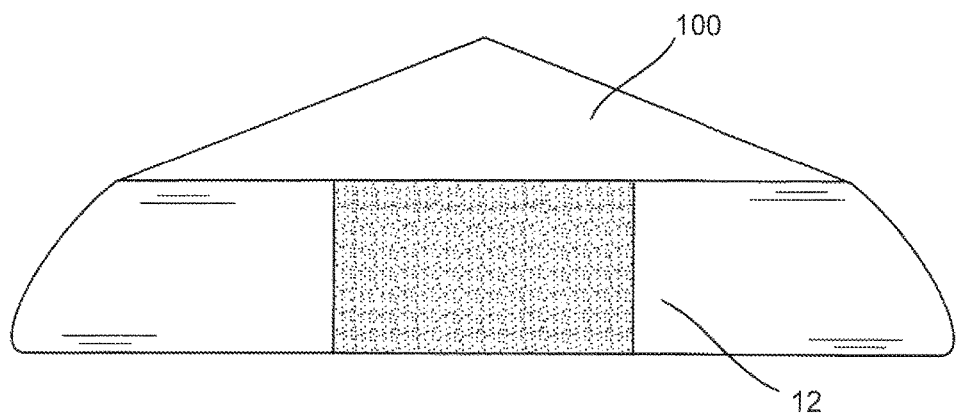
FIG. 18 is a front view of FIG. 16.

FIGS. 1-18 illustrate an embodiment of a support assembly, which is designated hereinafter by reference numeral 10. As will be described in more detail below, in general the support assembly 10 includes a substantially tubular member 12, a first insert 14, a second insert 16, a first end cap 18, a second end cap 20 and a plurality of fasteners 22A, 22B. The support assembly 10 can be used, for example, as a foot rest, a grab bar, a mounting structure in conjunction with bath accessories or as support for any structure (e.g., shelving). Although the support assembly 10 is shown as including a tubular member 12 that is substantially cylindrical, the tubular member 12 can be any supporting body of any shape that extends between at least a first end cap and a second end cap. For example, as shown in an embodiment in FIGS. 16-18, the support assembly includes a shelving support 100 that includes a cantilevered plate attached (e.g., welded) to a tubular member.

As shown in an embodiment in FIGS. 1-15, the tubular member 12 is an elongated hollow cylindrical structure that includes an outer surface 24 and an inner surface 26 and that is delimited between a first end 28 and a second end 30. The first end 28 and the second end 30 of the tubular member 12 are both angled such that a first plane extending along the first end 28 and a second plane extending along the second end 30 converge and intersect each other at a central point between the ends 28, 30 of the tubular member 12. As such, in an embodiment, the first angled end 28 and the second angled end 30 allow for the support assembly 10 to be mounted between two converging surfaces 32, 34 (See FIGS. 14 and 15) that are substantially perpendicular to each other. In an embodiment, the first end 28 and the second end 30 are both angled at approximately about 45 degrees.

As will be explained in more detail below, as shown in FIGS. 1, 2 and 5-8, a first opening 36 extends through the tubular member 12 substantially transverse to and near the first end 28 of the tubular member 12 and a second opening 38 extends through the tubular member 12 substantially transverse to and near the second end 30 of the tubular member 12.

Figure 1:
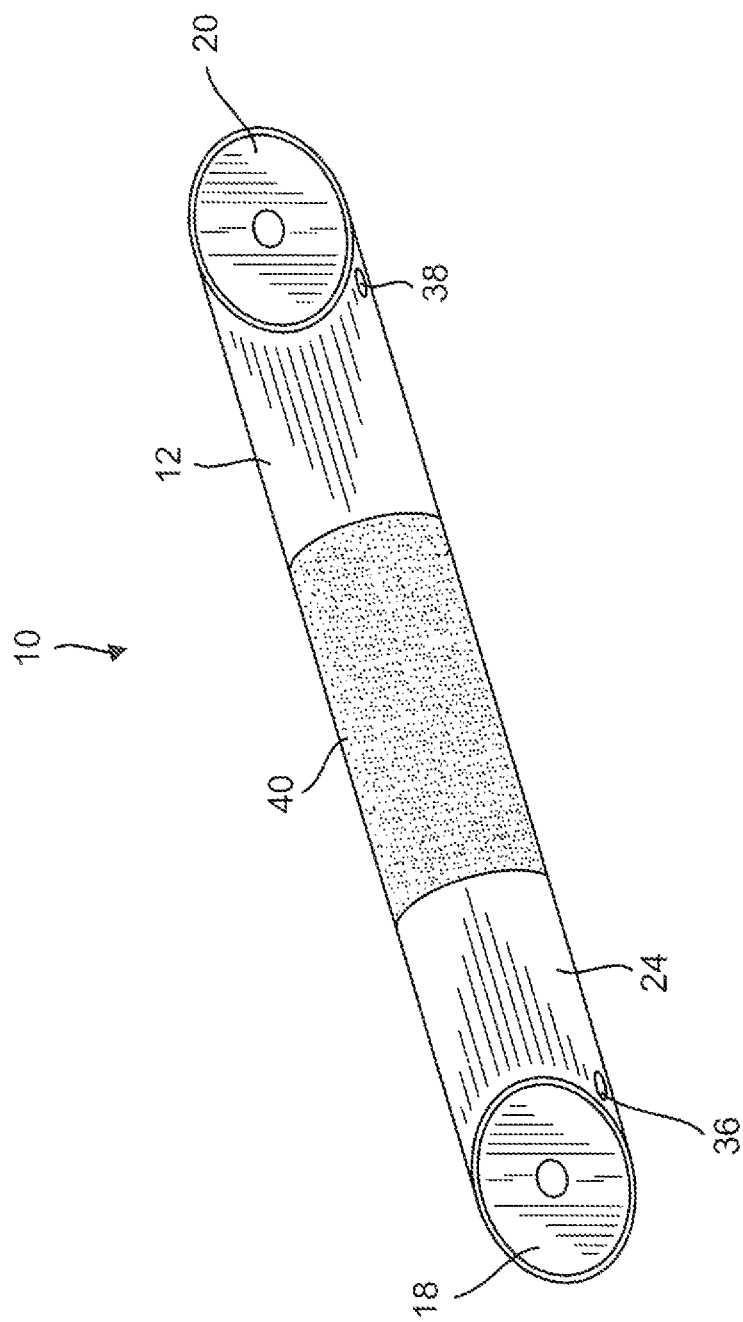
FIG. 1 is a perspective view of an embodiment of a support assembly of the present invention.
Figure 2:
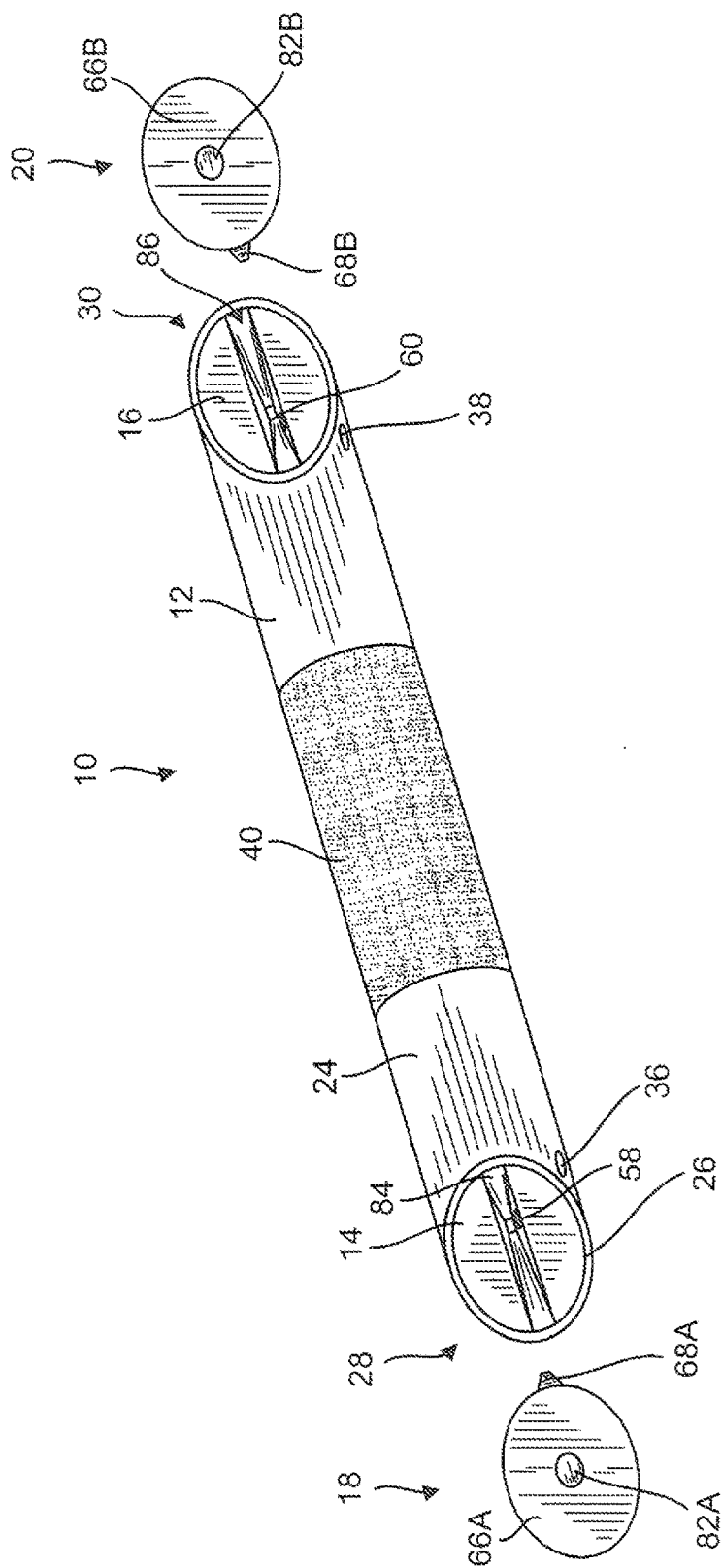
FIG. 2 is a perspective view of the support assembly of FIG. 1 with the end caps in an uninstalled state.
Figure 3:
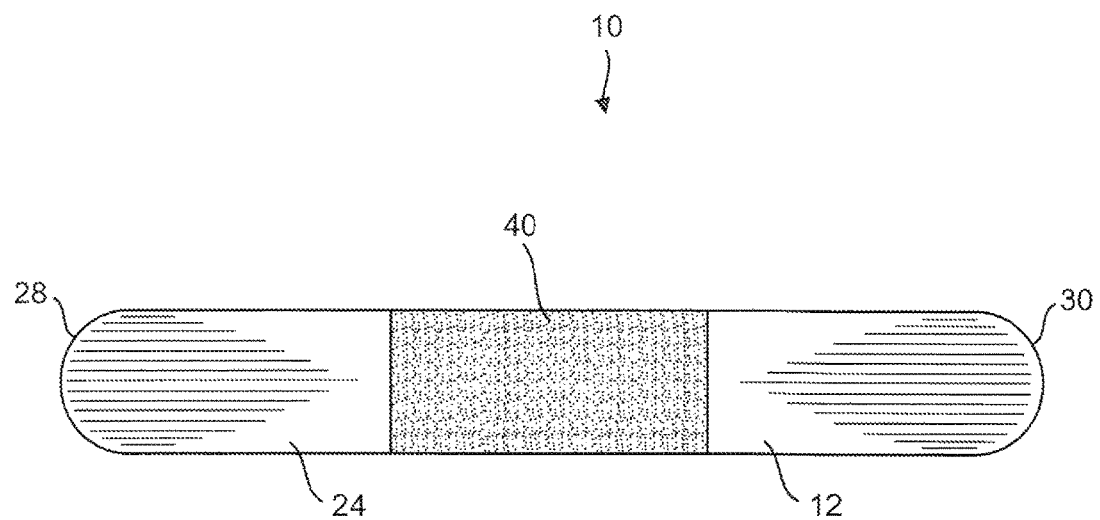
FIG. 3 is a front view of the support assembly of FIG. 1
Figure 4:
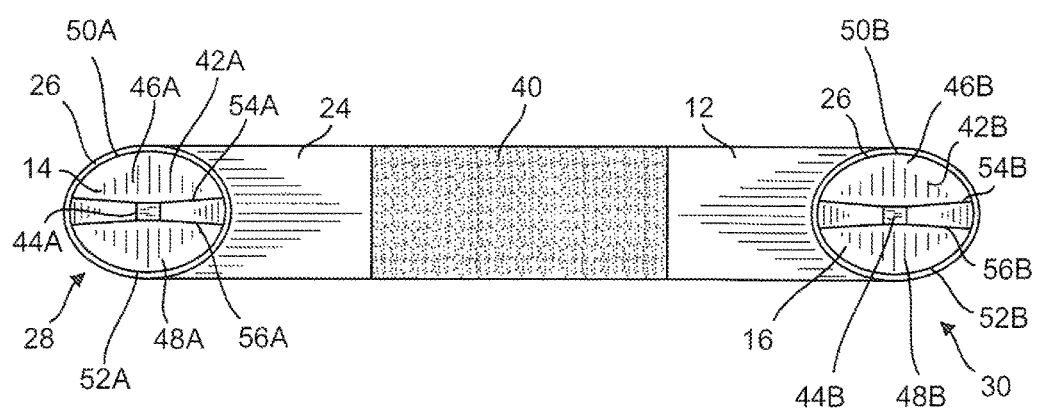
FIG. 4 is a rear view of the support assembly of FIG. 1.
Figure 5:
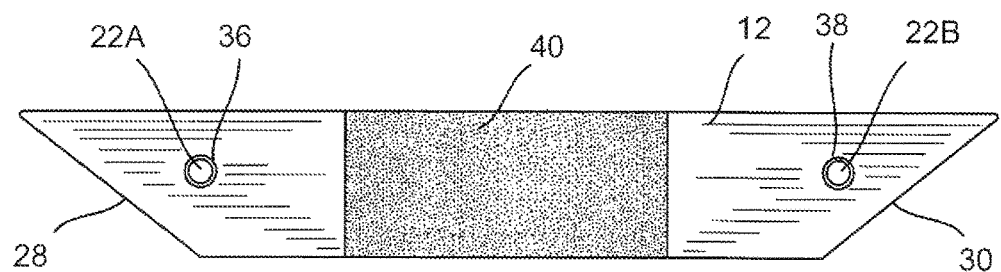
FIG. 5 is a bottom view of the support assembly of FIG. 1.
Figure 6:
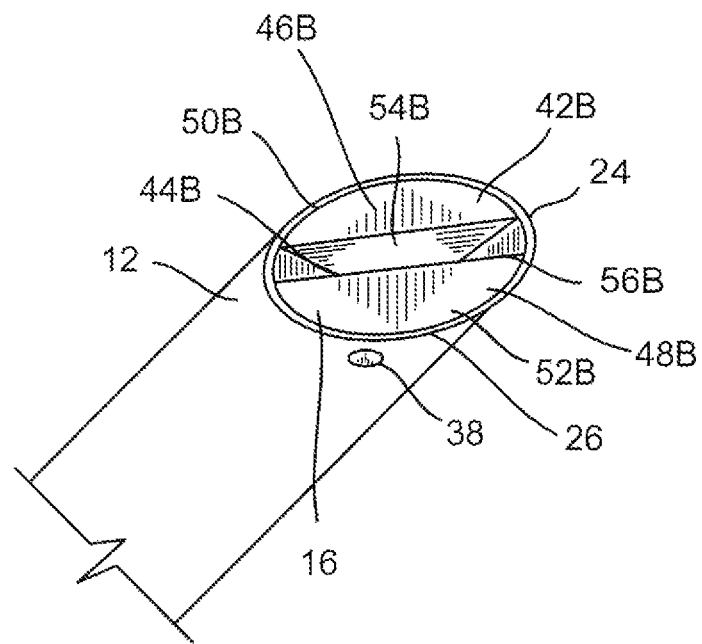
FIG. 6 is a first perspective view of an end of the support assembly of FIG. 1.

As shown in an embodiment in FIG. 2, the first end 28 and the second end 30 of the tubular member 12 are substantially ovoid. In an embodiment, the tubular member 12 is formed from metal such as stainless steel (e.g., 18/8 (304) stainless steel). However, the tubular member 12 can be formed from any material that is known or may become known that allows for sustaining a force to be applied thereto. As can be seen in an embodiment in FIG. 1, an anti-slip grip 40 can extend about at least a portion of the outer surface 24 of the tubular member 12.

As depicted, for example, in FIG. 2, the first insert 14 is fixed within the first end 28 of the tubular member 12 and the second insert 16 is fixed within the second end 30 of the tubular member 12. The first insert 14 and second insert 16 can be fixed within the tubular member by press fit, welding, bonding (e.g. using an adhesive), fastening or the like.

Figure 7:
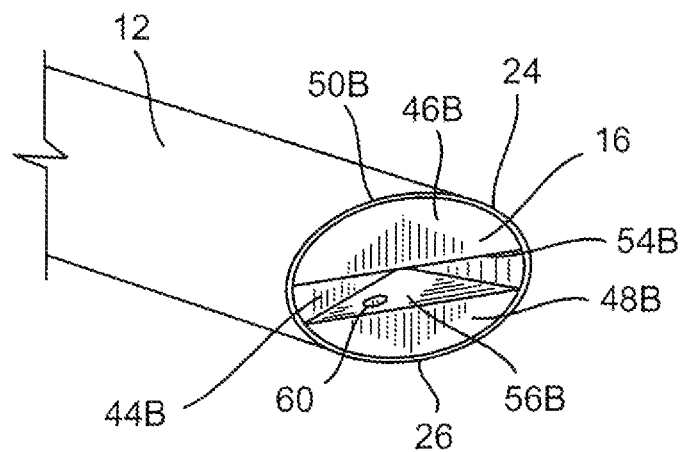
FIG. 7 is a second perspective view of an end of the support assembly of FIG. 1.
Figure 8:
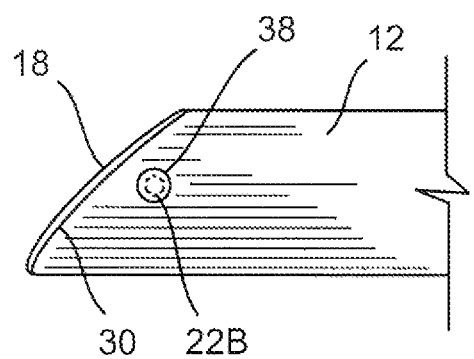
FIG. 8 is a partial bottom view of an end of the support assembly of FIG. 1.
Figure 9A:
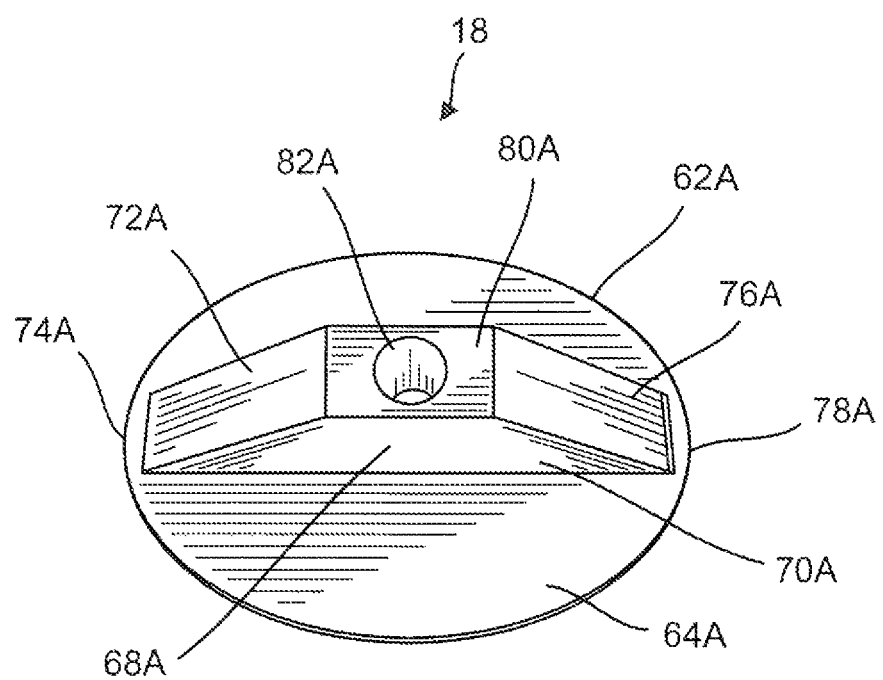
FIG. 9A is a perspective view of a first end cap of the support assembly of FIG. 1.
Figure 9B:
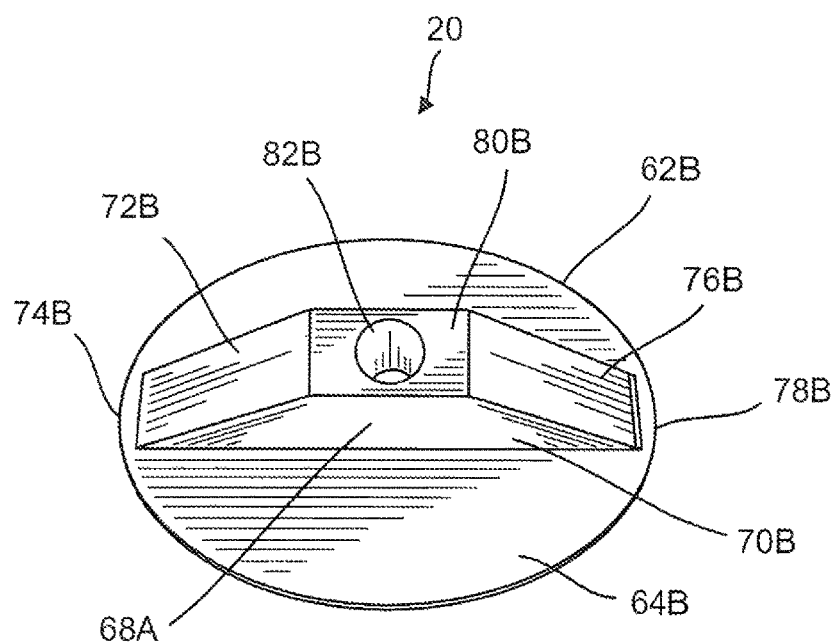
FIG. 9B is a perspective view of a second end cap of the support assembly of FIG. 1.
Figure 10A:
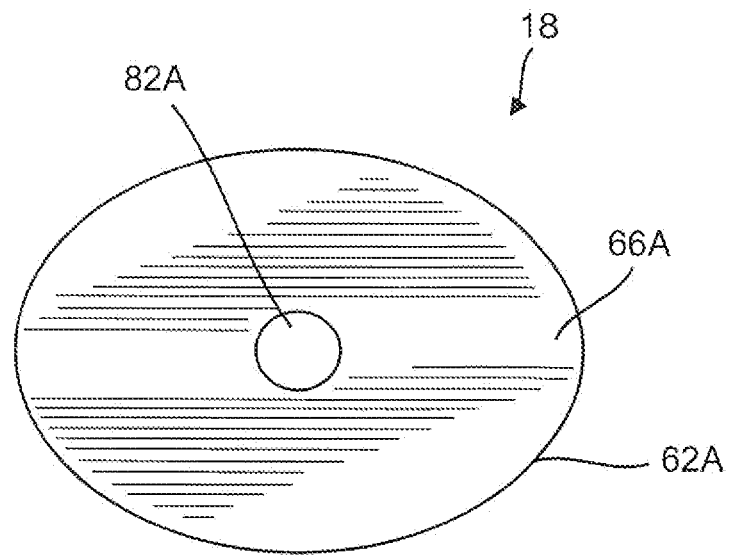
FIG. 10A is a front view of the first end cap of the support assembly of FIG. 1.
Figure 10B:
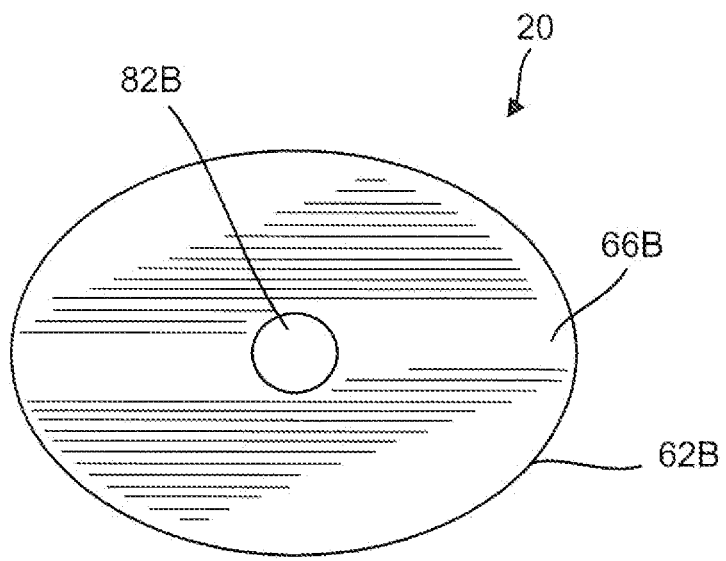
FIG. 10B is a front view of the second end cap of the support assembly of FIG. 1.
Figure 11A:
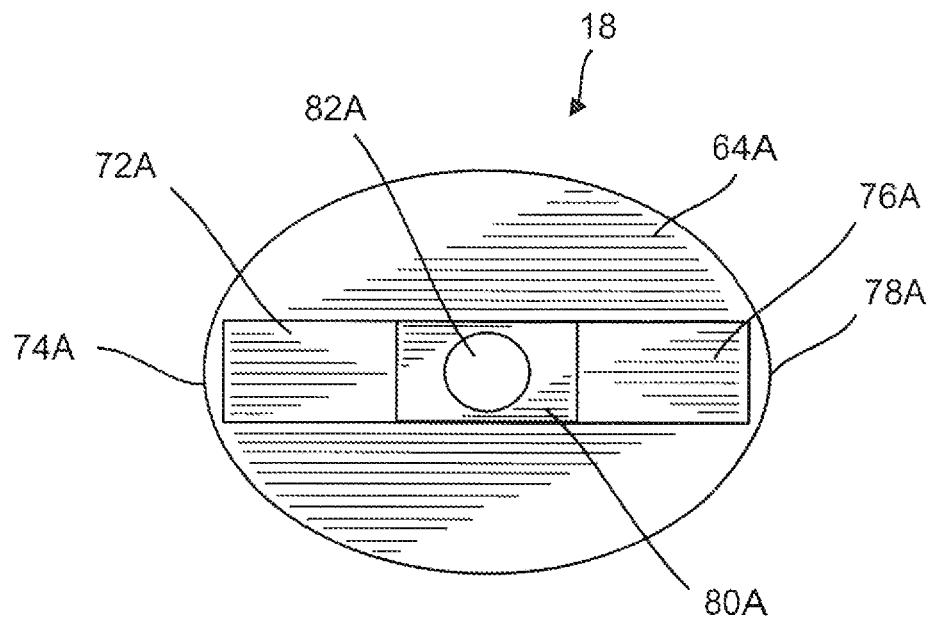
FIG. 11A is a rear view of the first end cap of the support assembly of FIG. 1.
Figure 11B:
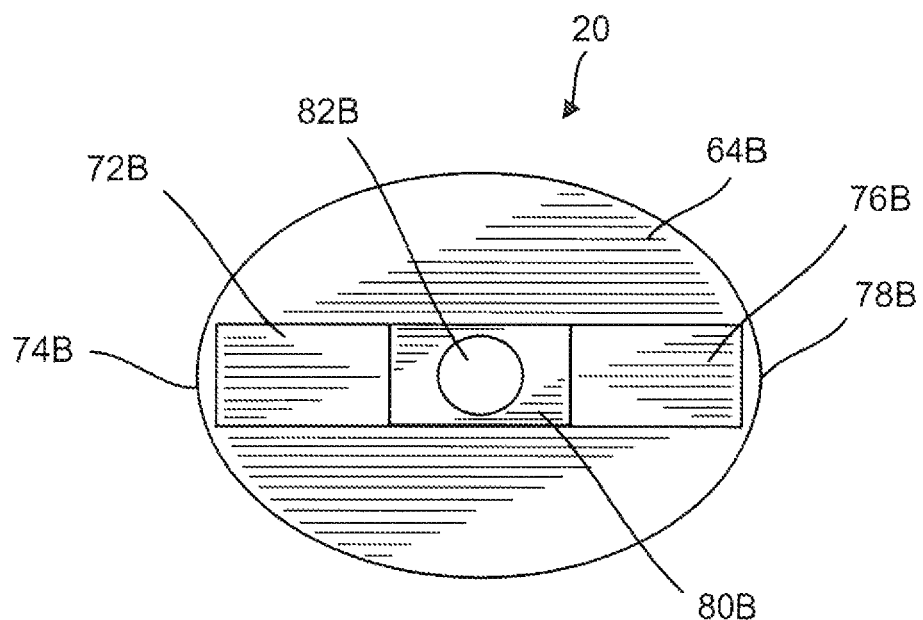
FIG. 11B is a rear view of the second end cap of the support assembly of FIG. 1.
Figure 12A:
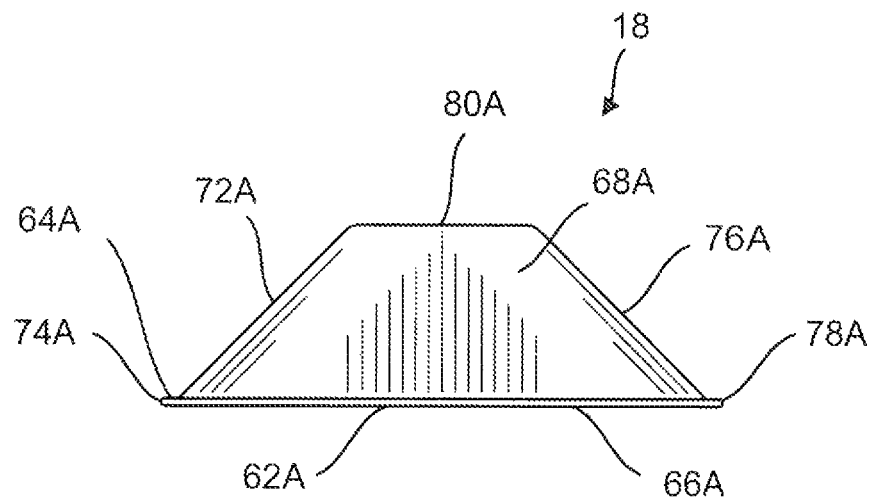
FIG. 12A is a top view of the first end cap of the support assembly of FIG. 1.
Figure 12B:
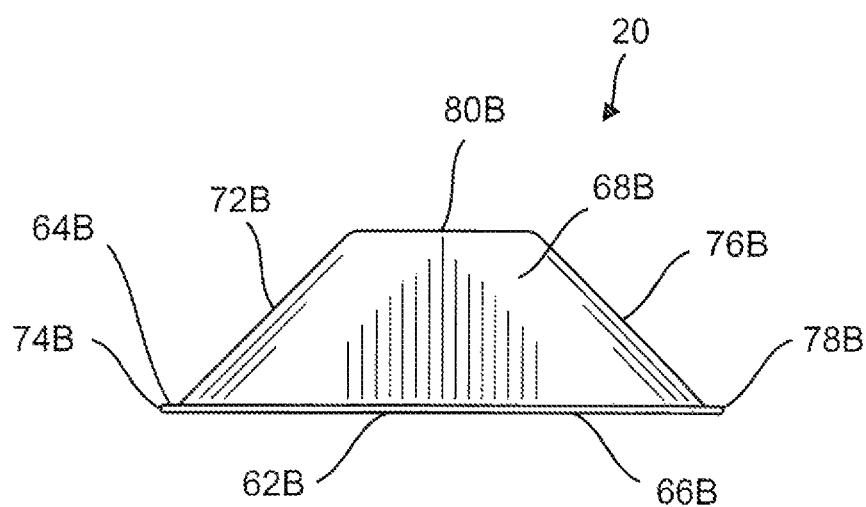
FIG. 12B is a top view of the second end cap of the support assembly of FIG. 1.
Figure 13A:
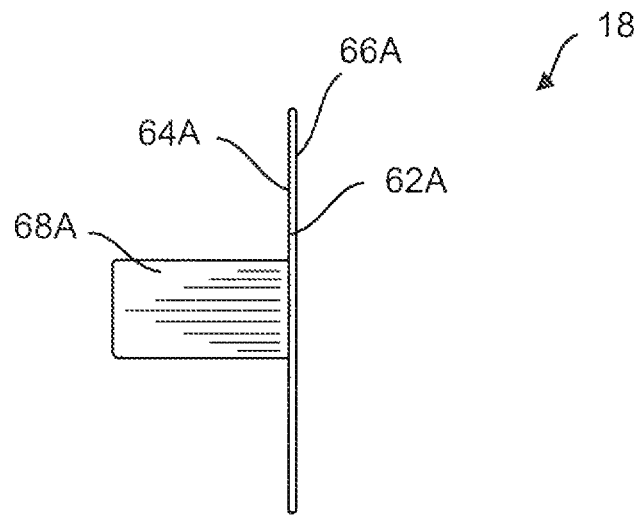
FIG. 13A is a side view of the first end cap of the support assembly of FIG. 1.
Figure 13B:
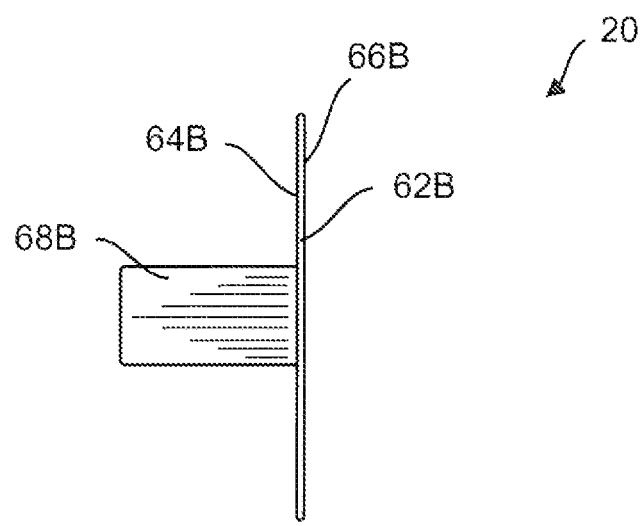
FIG. 13B is a side view of the second end cap of the support assembly of FIG. 1.

In an embodiment, the first insert 14 and the second insert 16, respectively include a body 42A, 42B that has a base 44A, 44B, a first projection 46A, 46B that extends from the base 44A, 44B in a first direction and a second projection 48A, 48B that is spaced from the first projection 46A, 46B and extends from the base 44A, 44B in the first direction as well. Both the first projection 46A, 46B and the second projection 48A, 48B include an outer surface 50A, 50B, 52A, 52B, respectively, that is contoured to be contactable with the inner surface 26 of the tubular member 12 and an inner surface 54A, 54B, 56A, 56B that extends substantially linearly from the base 44A, 44B of the first and second insert 14, 16, respectively. In an embodiment, the outer surfaces 50A, 50B, 52A, 52B of the inserts 14, 16 are substantially ovoid. As can be seen in FIG. 2, the first and second projections 46A, 46B, 48A, 48B extend at an angle from the base 44A, 44B that is substantially the same as the angle of the first end 28 of the tubular member 12. As such, the inner surfaces 54A, 54B, 56A, 56B of the projections 46A, 46B, 48A, 48B are substantially triangular. In an embodiment as shown in FIG. 7, the inner surfaces 54A, 54B, 56A, 56B of the first and second projection 46A, 46B, 48A, 48B each form a right triangle. However, the inserts 14, 16 can be configured to be any shape and/or size to accommodate the end caps 18, 20.

As shown in an embodiment in FIG. 2, a first hole 58 extends through one of the first projection 46A and the second projection 48A of the first insert 14 with the first insert 14 adaptable such that the first hole 58 is in alignment with the first opening 36 formed in the tubular member 12. As shown in FIGS. 2 and 7, a second hole 60 extends through one of the first projection 46B and the second projection 48B of the second insert 16, which is adaptable so that the second hole 60 is in alignment with the second opening 38. In an embodiment, the first hole 58 can be formed in both the first projection 46A and the second projection 48A of the first insert 14 and the second hole 60 can be formed in both the first projection 46B and the second projection 48B of the second insert 16.

FIGS. 9-13 illustrate an embodiment the first end cap 18 and the second end cap 20 that are configured to be arranged within the first insert 14 and the second insert 16, respectively, to fix the tubular member 12 to a structure. The first end cap 18 and the second end cap 20, respectively include a body 62A, 62B that has a first surface 64A, 64B and a second surface 66A, 66B, which opposes the first surface 64A, 64B. As shown in an embodiment in FIGS. 9-11, the body 62A, 62B of the first and second end cap 18, 20, respectively, is substantially ovoid. A trapezoidal element 68A, 68B extends, respectively, from the first surface 64A, 64B of the body 62A, 62B of the end caps 18, 20. In an embodiment, the body 62A, 62B is substantially ovoid. However, the end caps can be of any shape and the elements that extend from the end caps can also be of any shape that substantially matches the opening within the inserts 12, 14.

In an embodiment, the trapezoidal element 68A, 68B includes a first base 70A, 70B that substantially extends along longitudinal diameter from the first surface 64A, 64B of the body 62A, 62B of the end caps 18, 20, a first sidewall 72A, 72B extends at or near a first end 74A, 74B of the first base 70A, 70B at an angle, a second sidewall 76A, 76B extends at or near a second end 78A, 78B of the first base 70A, 70B at an angle and a second base 80A, 80B that is spaced from and substantially parallel to the first base 70A, 70B and that extends between the first sidewall 72A, 72B and the second sidewall 76A, 76B. With the trapezoidal element 68A, 68B encompassing the end caps 18, 20 and interacting with the inserts 14, 16, respectively, rotational forces are substantially mitigated.

Figure 14:
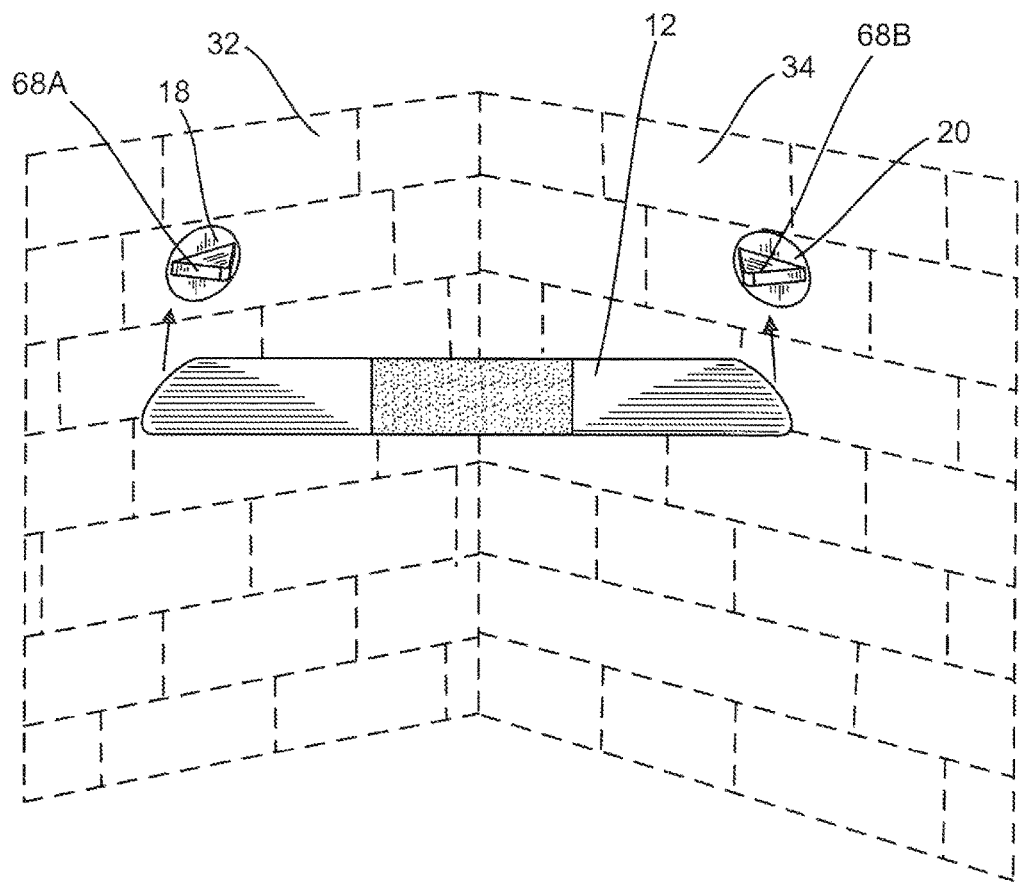
FIG. 14 is an installation view of the end caps and tubular member of the support assembly being fixed to a structure.
Figure 15:
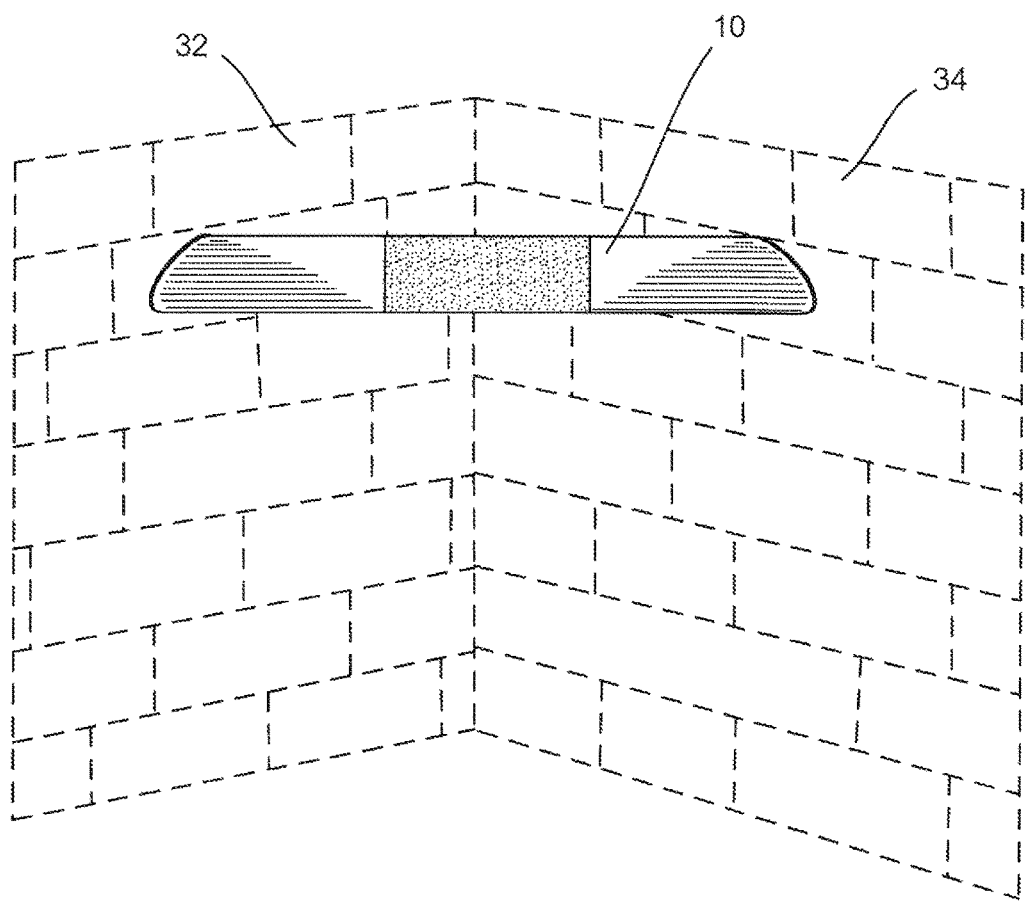
FIG. 15 is a perspective view of the support assembly in an assembled state, fixed to a structure.

In an embodiment, the trapezoidal element 68A, 68B includes an opening 82A, 82B through which a fastener (e.g., a screw) can extend to fix the trapezoidal element 68A, 68B to a structure (see e.g., FIGS. 14 and 15). As can be seen in an embodiment in FIGS. 9-11, the opening 82A, 82B extends centrally from the second surface 66A, 66B of the body 62A, 62B of each of the end caps 18, 20 through the first base 70A, 70B and second base 80A, 80B of the trapezoidal element 68A, 68B. The trapezoidal element 68A, 68B herein allow room for the head of a mounting screw.

As shown in FIG. 14, upon fastening the end caps 18, 20 to a structure, the tubular element 12 can be slide over the trapezoidal elements 68A, 68B, arranging the first trapezoidal element 68A within a slot 84 of the first insert 14 formed between the inner surface 54A, 56A of the first and second projections 46A, 48A and the second trapezoidal element 68B within the slot 86 formed between the inner surface 54B, 56B of the first and second projections 46B, 48B of the second insert 16. A first fastener 22A can be inserted through the first opening 36 in the tubular member 12 and the first hole 58 of the first insert 14 and contact the trapezoidal element 68A to fix the first end cap 18 within the tubular member 12 and a second fastener 22B can be inserted through the second opening 38 in the tubular member 12 and the second hole 60 of the second insert 48 and contact the trapezoidal element 68B to fix the second end cap 20 within the tubular member 12. In an embodiment, the first hole 58 of the first insert 46 and the second hole 60 of the second insert 48 include threading (not shown) extending about each opening 58, 60 and the fastener 22A, 22B is a set screw with threading that fixes the end caps 18, 20 within the inserts 46, 48 and to the tubular member 12.

Because the end caps 18, 20 are not mounted in parallel to each other the rotational axes of the end caps 18, 20 contrast each other and in turn stabilize the tubular element 12. The moment forces only exist in the area of the tubular element 12 that exceeds the axes of the end caps. As such, the moment forces are minimized and the torsion forces are negated by opposing each other resulting in an assembly that is stable and does not rotate upon a force being applied thereto.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

What is claimed is:

1. A support assembly comprising:
    a tubular apparatus extending from a first end face to a second end face along a longitudinal axis and having a fixed length measured from the first end face to the second end face, the first end face lying in a first plane that is oriented at a first oblique angle relative to the longitudinal axis and the second end face lying in a second plane that is oriented at a second oblique angle relative to the longitudinal axis, the first and second planes intersecting in a line that is noncoplanar and perpendicular to the longitudinal axis;
    a first slot formed into the first end face of the tubular apparatus and a second slot formed into the second end face of the tubular apparatus;
    a first end cap comprising a first block element having a planar top surface, the first end cap configured to be coupled to a first portion of a support surface so that the first block element protrudes from the first portion of the support surface;
    a second end cap comprising a second block element having a planar top surface, the second end cap configured to be coupled to a second portion of the support surface so that the second block element protrudes from the second portion of the support surface; and
    wherein the tubular apparatus is mounted to the first and second end caps so that the first block element is positioned within the first slot and an upper surface of the first slot rests atop the planar top surface of the first block element and the second block element is positioned within the second slot and an upper surface of the second slot rests atop the planar top surface of the second block element.

2. The support assembly according to claim 1 wherein the first and second oblique angles are approximately 45° and the first and second planes intersect at a 90° angle.

3. The support assembly according to claim 1 wherein the tubular apparatus comprises a monolithic tubular member extending from a first end to a second end along the longitudinal axis, the tubular member having an inner surface that defines a hollow interior, a first insert located within the hollow interior at the first end of the monolithic tubular member without protruding from the first end of the monolithic tubular member and a second insert located within the hollow interior at the second end of the monolithic tubular member without protruding from the second end of the monolithic tubular member.

4. The support assembly according to claim 3 wherein the first insert comprises a base and first and second projections extending from the base, wherein the first slot is formed between an inner surface of the first projection of the first insert and an inner surface of the second projection of the first insert, the inner surface of the first projection of the first insert forming the upper surface of the first slot, and wherein the second insert comprises a base and first and second projections extending from the base, wherein the second slot is formed between an inner surface of the first projection of the second insert and an inner surface of the second projection of the second insert, the inner surface of the first projection of the second insert forming the upper surface of the second slot.

5. The support assembly according to claim 1 wherein the first and second block elements have a triangular or trapezoidal shape.

6. The support assembly according to claim 1 wherein the first end cap comprises a body portion having a front surface and a rear surface opposite the front surface, and wherein the first block element comprises a first sidewall extending from the front surface of the body portion to a distal edge, and a second sidewall extending from the front surface of the body portion to a distal edge, the planar top surface of the first block element extending between upper edges of the first and second sidewalls, and wherein the first and second sidewalls converge towards one another with increasing distance from the front surface of the body portion.

7. The support assembly according to claim 6 wherein the first block element comprises a distal base surface extending between the distal edges of the first and second sidewalls, and further comprising an opening extending through the first end cap from the distal base surface of the first block element to the rear surface of the body portion, and a fastener extending through the opening to couple the first end cap to the first portion of the support surface.

8. The support assembly according to claim 1 wherein the planar top surfaces of the first and second block elements have a triangular or trapezoidal shape.

9. The support assembly according to claim 1 wherein the first end cap comprises a body portion having a front surface and a rear surface opposite the front surface, the first block element extending from the front surface of the body portion of the first end cap, and wherein the second end cap comprises a body portion having a front surface and a rear surface opposite the front surface, the second block element extending from the front surface of the body portion of the second end cap.

10. The support assembly according to claim 9 wherein the first and second end caps are configured to be coupled to the support surface with the rear surfaces of the body portions in contact with the support surface.

11. The support assembly according to claim 1 wherein the tubular apparatus comprises an axial center-point located equidistant from the first and second end faces, the first and second end faces each having a distal-most portion located furthest from the axial center-point and a proximal-most portion located closest to the axial center-point, wherein the first slot comprises an elongated opening in the first end face that extends from the distal-post portion of the first end face to the proximal-most portion of the first end face, and wherein the second slot comprises an elongated opening in the second end face that extends from the distal-most portion of the second end face to the proximal-most portion of the second end face.

12. The support assembly according to claim 1 wherein the first and second portions of the support surface are perpendicular to one another.

13. A support assembly comprising:
    a tubular apparatus extending from a first end face to a second end face along a longitudinal axis, the first end face lying in a first plane that is oriented at a first oblique angle relative to the longitudinal axis and the second end face lying in a second plane that is oriented at a second oblique angle relative to the longitudinal axis, the first and second planes intersecting in a line that is noncoplanar and perpendicular to the longitudinal axis;
    a first slot formed into the first end face of the tubular apparatus and a second slot formed into the second end face of the tubular apparatus;
    a first end cap and a second end cap configured to be coupled to a support surface in a spaced apart manner, each of the first and second end caps comprising a block element having a top surface, a bottom surface opposite the top surface, a first sidewall extending between the top and bottom surfaces, and a second sidewall extending between the top and bottom surfaces, the first and second sidewalls converging towards one another; and wherein the tubular apparatus is mounted to the first and second end caps so that the block element of the first end cap is positioned within the first slot and the block element of the second end cap is positioned within the second slot.

14. The support assembly according to claim 13 wherein the tubular apparatus has a fixed length measured from the first end face to the second end face.

15. The support assembly according to claim 13 wherein the block elements of the first and second end caps have a triangular or trapezoidal shape.

16. The support assembly according to claim 15 wherein the first and second slots have a triangular shape.

17. The support assembly according to claim 13 wherein the first end cap comprises a body portion having a front surface and a rear surface opposite the front surface, the block element of the first end cap extending from the front surface of the body portion of the first end cap and the rear surface of the body portion of the first end cap contacting the support surface, and wherein the second end cap comprises a body portion having a front surface and a rear surface opposite the front surface, the block element of the second end cap extending from the front surface of the body portion of the second end cap and the rear surface of the body portion of the second end cap contacting the support surface.

18. A support assembly comprising:

a tubular apparatus extending along a first axis and being delimited by a first end face oriented at a first angle relative to the first axis and a second end face oriented at a second angle relative to the first axis such that the first end face lies in a first plane and the second end face lies in a second plane that intersects the first plane in a line that is noncoplanar and perpendicular to the first axis, wherein the tubular apparatus has a fixed length measured from the first end face to the second end face;

a first end cap being mountable to a first surface which lies in a third plane, the first end cap comprising a first body having a front surface and a rear surface and a first block element extending from the front surface along a second axis; and a second end cap being mountable to a second surface that lies in a fourth plane which intersects the third plane, the second end cap comprising a second body having a front surface and a rear surface and a second block element extending from the front surface along a third axis; and wherein the tubular apparatus is mounted to the first and second end caps with the first block element of the first end cap arranged within the first end of the tubular apparatus such that the first axis of the tubular apparatus and the second axis of the first block element of the first end cap intersect at an acute angle and the second block element of the second end cap is arranged within the second end of the tubular apparatus such that the first axis of the structural member and the third axis of the second block element of the second end cap intersect at an acute angle.

19. The support assembly according to claim 18 wherein the tubular apparatus has a constant outer diameter.

20. The support assembly according to claim 18 wherein top surfaces of the first and second block elements are planar.

* * * * *